United States Patent [19]
Kobrosly

[11] Patent Number: 5,629,878
[45] Date of Patent: May 13, 1997

[54] TEST PLANNING AND EXECUTION MODELS FOR GENERATING NON-REDUNDANT TEST MODULES FOR TESTING A COMPUTER SYSTEM

[75] Inventor: Walid M. Kobrosly, Round Rock, Tex.

[73] Assignee: International Business Machines Corporation, Armonk, N.Y.

[21] Appl. No.: 133,481

[22] Filed: Oct. 7, 1993

[51] Int. Cl.$^6$ ........................................... G05B 1/00
[52] U.S. Cl. ................. 364/579; 364/580; 364/550; 364/551.01; 395/10; 395/185.01; 395/183.01; 371/27
[58] Field of Search ........................... 364/579, 550, 364/580, 551.01; 395/50, 911, 917, 916, 908, 182.07, 183.01, 183.07, 185.01; 371/20.1, 27, 25.1, 67.1; 379/10, 15; 324/73.1

[56] References Cited

U.S. PATENT DOCUMENTS

| | | | |
|---|---|---|---|
| 4,649,515 | 3/1987 | Thompson et al. | 395/61 |
| 4,654,852 | 3/1987 | Bentley et al. | 371/29.1 |
| 4,841,456 | 6/1989 | Hogan, Jr. et al. | 364/550 |
| 4,847,795 | 7/1989 | Baker et al. | 364/579 |
| 4,881,230 | 11/1989 | Clark et al. | 371/20.1 |
| 4,964,125 | 10/1990 | Kim | 371/15.1 |
| 4,972,453 | 11/1990 | Daniel, III et al. | 379/10 |
| 4,985,857 | 1/1991 | Bajpai et al. | 364/551.01 |
| 5,067,129 | 11/1991 | Evans et al. | 371/16.1 |
| 5,159,685 | 10/1992 | Kung | 395/908 |
| 5,243,273 | 9/1993 | McAuliffe et al. | 324/73.1 |
| 5,323,108 | 6/1994 | Marker, III et al. | 324/73.1 |
| 5,388,189 | 2/1995 | Kung | 395/917 |
| 5,390,232 | 2/1995 | Freeman et al. | 379/10 |
| 5,416,825 | 5/1995 | Renger et al. | 379/10 |

OTHER PUBLICATIONS

IBM Technical Disclosure Bulletin, vol. 33, No. 6B, Nov. 1990, "Knowledge-Based Test System", pp. 440-441, by Smith.

IBM Technical Disclosure Bulletin, vol. 34, No. 6, Nov. 1991, "Declarative Product Data Base For A Design Verification Test Generation Expert System", pp. 53-56, by Reynolds.

IBM Technical Disclosure Bulletin, vol. 30, No. 10, Mar. 1988, "Expert System To Ease Repair Of Printed Circuit Boards", pp. 314-316, by Walter.

Virginia Polytechnic Institute And State University Model-Based Reasoning, "Expert Systems Without an Expert: Fault Diagnosis Based on Casual Reasoning", pp. 19-29, by Whitehead et al.

IEEE Design and Test, "Mind: An Inside Look at an Expert System for Electronic Diagnosis", pp. 69-76, by Wilkinson.

"An Expert System For Help To Fault Diagnosis On VLSI Memories", pp. 153-159, by Viacroze et al.

arc Automated Reasoning Corporation, "Micro IN-ATE".

Primary Examiner—Edward R. Cosimano
Assistant Examiner—Hal D. Wachsman
Attorney, Agent, or Firm—Calfee, Halter & Griswold LLP

[57] ABSTRACT

A knowledge base having non-redundant test modules is developed for the purpose of testing a computer system. The uniqueness of the test modules is insured by comparing all new modules considered for inclusion with the existing knowledge base. As a result of this comparison, a cluster of modules, with properties similar to those of the module being considered for inclusion, is generated. The cluster of modules is then analyzed and a determination is made whether or not the cluster collectively, or a module within the cluster, is sufficient for testing a particular component/unit within a system. If the cluster is deemed sufficient, the candidate module is discarded. Otherwise, the candidate module is added to the knowledge base to enhance the effectiveness of the cluster, or to start a new testing cluster. After the knowledge base is developed, it is applied to generate non-redundant tests based on given criteria. The test is then executed and the results are recorded in the knowledge base.

4 Claims, 6 Drawing Sheets

|  | 1 | 2 | 3 |
|---|---|---|---|
| NAME OF MODULE: | —— | —— | —— |
| STATUS: | —— | —— | —— |
| TEST PLAN NAME #1: | —— | —— | —— |
| DATE ENTERED: | —— | —— | —— |
| TEST PLAN NAME #2: | —— | —— | —— |
| DATE EXECUTED: | —— | —— | —— |
| SYSTEM: | 4381 | 4381 | 4381 |
| SUB-SYSTEM: | HDWR | HDWR | MCODE |
| UNIT: | CPU | I/O | I/O |
| COMPONENT: | FLOATING POINT | CONTROL UNIT | DASD DEVICE |
| TEST TOOL: | A | B | B |
| TEST TOOL OPTIONS: | $x_1, y_1$ | $x_2, y_2, z_2$ | $x_2, y_2, z_2$ |
| HARDWARE CONFIG: | 1 | 2 | 2 |
| DURATION: | 8 HRS. | 4 HRS. | 12 HRS. |
| LEVEL OF MCODE: | 1 | 1 | 1 |
| LEVEL OF HARDWARE: | 2 | 2 | 2 |
| PURPOSE OF TEST: | —— | —— | —— |
| TEST RESULTS: | —— | —— | —— |
| COMMENTS: | —— | —— | —— |

FIG. 2(a)

|  | 4 | 5 | 6 |
|---|---|---|---|
| NAME OF MODULE: | ___ | ___ | ___ |
| STATUS: | ___ | ___ | ___ |
| TEST PLAN NAME #1: | ___ | ___ | ___ |
| DATE ENTERED: | ___ | ___ | ___ |
| TEST PLAN NAME #2: | ___ | ___ | ___ |
| DATE EXECUTED: | ___ | ___ | ___ |
| SYSTEM: | 4381 | 4381 | 9370 |
| SUB-SYSTEM: | MCODE | MCODE | MCODE |
| UNIT: | SOPPORT PROC. | IPL FCN. | I/O |
| COMPONENT: | DISPLAY FCN. | CONTROL UNIT | DASD DEVICE |
| TEST TOOL: | C | B | B |
| TEST TOOL OPTIONS: | $x_3$ | $x_2, y_2, z_2$ | $x_2, y_2, z_2$ |
| HARDWARE CONFIG: | 3 | 2 | 2 |
| DURATION: | 10 HRS. | 12 HRS. | 12 HRS. |
| LEVEL OF MCODE | 2 | 1 | 1 |
| LEVEL OF HARDWARE: | 3 | 2 | 2 |
| PURPOSE OF TEST: | ___ | ___ | ___ |
| TEST RESULTS: | ___ | ___ | ___ |
| COMMENTS: | ___ | ___ | ___ |

FIG. 2(b)

TEST PLANNING AND EXECUTION MODELS FOR GENERATING NON-REDUNDANT TEST MODULES FOR TESTING A COMPUTER SYSTEM

BACKGROUND OF THE INVENTION

1. Field of the Invention

The present invention relates generally to methods (and corresponding apparatus) for planning and executing the testing of computer systems. Such methods are generally referred to hereinafter as test planning and execution "models". More particularly, the invention relates to test planning and execution models that include methods (and corresponding apparatus) for generating a set of non-redundant (unique) test modules which define the steps needed to test a component or unit within a given computer system.

According to one aspect of the invention, the test planning and execution models contemplated herein may be characterized as processes in which a knowledge base, that includes a set of unique test modules, is first built and then utilized to generate non-redundant test cases.

The non-redundant test cases are generated by querying the constructed knowledge base for test modules fitting a given criteria, such as the component or unit under test, purpose of the test being run, etc. The non-redundant test cases may then be executed with the results serving as further input, according to a preferred embodiment of the invention, for updating the knowledge base.

Further aspects of the invention include methods (and corresponding apparatus) for actually generating the aforementioned set of non-redundant test modules; and for actually generating and executing the aforementioned non-redundant test cases.

The invention facilitates automatic redundancy checking of test modules used for testing a computer system utilizing predefined criteria expressed as a set of parameters aimed at detecting redundant tests. The invention also provides for the dynamic generation of test plans using the predefined criteria and non-redundant test modules.

2. Definitions

The following definitions are used herein:

Test Tool: A control program and all the needed hardware and software applied to test the functions of a computer system. Test tools may execute test cases on an individual basis (one at a time), or on a continuous basis.

Test Case: A program that is executed by a test tool and which has a specific test objective. Such a program executes a set of instructions and determines results, outputting the status of each unit or component under test.

Test Module: A knowledge base entry (or data set) that includes a set of parameters defining the steps needed to test a component or unit within a given computer system. A test module although being a data set is referred to herein as being "executed" when the aforementioned steps have been performed.

Cluster of Modules: A set of test modules exhibiting predefined characteristics based on given criteria. Also referred to in the art as a "Test Bucket".

Knowledge Base: A data base that is updated over time (on either a periodic or continuous basis) so that the data base as updated becomes an acquired knowledge about a given subject matter. For the purposes of the present invention, the data base becomes a knowledge base on how to test a computer.

"Investigation": Based on the input of a specified test module, the test planning and execution model contemplated by the invention outputs a number of test modules that having at least a predefined subset of parameters that are identical in value (as explained in detail hereinafter). By "investigation", as used herein, a user manually (or automatically by appropriate programing of a data processing device) reviews the modules output by the test planing and execution module and decides whether they are sufficient collectively or individually to accomplish a given test objective.

"Applying" a Knowledge Base: Once the knowledge base is established, a user prompts (queries) the knowledge base for modules to perform a specific test. The outcome of this prompt is a number of test modules that fit the prompt criteria. For example, a prompt may be:

1) Objective: Functional test
2) Unit: I/O
3) Component: Direct Access Storage Device (DASD)

The output of the prompt are the modules that fit the entered data (criteria) and this is referred to herein as "applying" a knowledge base.

3. Brief Description of the Prior Art

It is well known in the prior art to utilize knowledge bases for computer testing and fault diagnostic processing purposes. Examples of such systems include:

U.S. Pat. No. 4,985,857 which discloses a method and apparatus for diagnosing machines by using three unique modules: a Machine Information Database (MID), a Sensory Input Database (SID), and a Knowledge Base (KB);

U.S. Pat. No. 4,964,125 which discloses a method and apparatus for diagnosing equipment faults by utilizing an expert system including a knowledge base containing information regarding a module of the equipment;

U.S. Pat. No. 5,067,129 which discloses a service processor tester which automatically generates test cases by utilizing a knowledge base;

U.S. Pat. No. 4,847,795 which discloses a system for diagnosing defects in electronic assemblies by utilizing a knowledge base for storing information regarding the electronic assembly; and U.S. Pat. No. 4,649,515 which discloses a generic facility for the construction of knowledge based expert systems for sensor and interactive based process diagnosis.

Still further examples of patents which illustrate the present state of the art of computer test equipment and fault diagnosis processes which utilize knowledge bases or expert systems include, U.S. Pat. No. 4,841,456; U.S. Pat. No. 4,972,453; U.S. Pat. No. 4,654,852; U.S. Pat. No. 4,914,924; and U.S. Pat. No. 4,881,230.

None of the aforementioned illustrative prior art references teaches, claims or even suggests a test planning and execution model (as defined herein) which is used to generate non-redundant tests which may be used to test a computer system based on user selected criteria input to the model.

In fact, the normal practice for planning and executing tests to exercise computer hardware and/or software is to manually define what testing is required and then hold "walk thrus" of the various defined test modules to be sure all areas to be tested are covered.

Accordingly, it would be desirable to provide (a) methods (and corresponding apparatus) for automating the test planning and execution process; (b) test planning and execution models that are specifically well suited for automatically detecting test module redundancy; (c) methods (and corresponding apparatus) which automatically provide a user with a set of appropriate candidate non-redundant test cases based on user selected criteria input to the model; and (d)

test planing and execution models that can be rerun dynamically as a system design changes.

To complete the brief description of the prior art, an example of how the test planning and execution function is often carried out to test a computer system (without the benefit of the present invention), will be presented for the sake of illustration and comparison with the teachings of the invention set forth hereinafter. In particular, the example is based on the type of process used to test the IBM 9370 and IBM 9221 computer systems during their development phases ("IBM" is a registered trademark of the International Business Machines Corporation).

According to the exemplary prior art test planning and execution process the subject computer systems were first sub-divided into a number of components and units.

A unit, typically including a number of components, was defined (according to the exemplary process) as a functioning element within the microcode, or hardware, sub-system of the aforementioned computer systems under test. Examples of a unit within the microcode sub-system would be the processing unit (PU), the Support Processor (SP), the I/O Processor, etc. An example of a component within the Support Processor unit would be the Initial Microcode Load (IML).

After a given computer system was sub-divided as indicated hereinbefore, the responsibilities of testing the units and components was (as is often the case) distributed among teams within a system test organization. Each team proceeded by defining the scope and objective of the tests to be performed based on the system's specifications.

As a result, plans defining the steps needed to execute a test were generated. These plans were usually reviewed by other teams within the system test organization, and other development groups (e.g., Product Assurance, etc.) to assure consistent and complete tests were developed.

The main topic for discussion during such reviews was generally the coverage of the proposed plans. For example, a plan may have over-looked the testing of a particular component, or contained insufficient testing of another component. During these reviews, detailed discussions about similarities among test plans were often found to be difficult to conduct because they require the participants to learn about the scope, objective and strategy of all test plans generated by a test organization.

To this end, it would be desirable to reduce redundant testing within a test plan or among multiple test plans within a test organization, by establishing a common knowledge base which is applied to generate non-redundant test modules.

The common knowledge base may (after its construction) be used to generate non-redundant test modules. The models contemplated by the invention do not propose to replace the process of assigning teams to test the units within the system, and reviewing of test plans. Also, the model does not provide the capability to generate the most effective test per se, which is left to the experienced test teams. However, the proposed model compliments the processes of establishing and reviewing of test plans by reducing redundant testing.

SUMMARY OF THE INVENTION

Accordingly, it is a general object of the invention to provide methods (and corresponding apparatus) for automating the test planning and execution process for testing a computer system.

More particularly, it is an object of the present invention to provide methods (and corresponding apparatus), for automating the test of a computer system,) which are well suited for automatically detecting test module redundancy.

Furthermore, it is an object of the present invention to provide methods and apparatus for testing a computer system that are less costly and more efficient that the aforementioned manual "walk thru" processes for testing a computer system.

Still further, it is an object of the invention to provide methods (and corresponding apparatus) which automatically provide a a user with a set of appropriate candidate non-redundant test cases based on user selected criteria input to a test planning and execution model of the type contemplated by the present invention.

Further yet, it is an object of the present invention to provide test planning and execution models that can be rerun dynamically as the design of a computer system changes.

Yet another object of the invention is to provide methods and apparatus for reducing redundant testing within a test plan or among multiple test plans within a test organization, by establishing a common knowledge base which is applied to generate non-redundant test modules and non-redundant test cases.

The overall test planning and execution modelling contemplated by the invention may be summarized as follows: First, a knowledge base consisting of unique test modules is developed for the purpose of testing a computer system. The uniqueness of the test modules is insured by comparing all new modules considered for inclusion with the existing knowledge base. As a result of this comparison, a cluster of modules, with properties similar to those of the module being considered for inclusion, is generated.

The cluster of modules is then analyzed (either manually, automatically via a data processing device such as a PC, or both), and a determination is made whether or not the cluster collectively, or a module within the cluster, is sufficient for testing a particular component/unit within a system.

If the cluster is deemed sufficient, the candidate module is discarded (also referred to herein as "rejected"). Otherwise, the candidate module is added to the knowledge base to enhance the effectiveness of the cluster, or to start a new testing cluster. After the knowledge base is developed, it is applied to generate non-redundant tests based on given criteria. The test is then executed and the results are recorded in the knowledge base.

A first specific aspect of the present invention is directed to a test planning and execution modelling process for testing a component or unit within a given computer system, comprising the steps of: (a) constructing a knowledge base from which a set of non-redundant test modules may be generated wherein each test module defines, in terms of a set of user specified parameters, the steps needed to test a component or unit within the given computer system; (b) querying the constructed knowledge base to identify non-redundant test modules fitting preselected criteria; and (c) generating, as a result of the query, a non-redundant test case which is capable of executing the non-redundant test modules identified in step (b).

A second specific aspect of the present invention is directed to a method for constructing a knowledge base from which non-redundant test modules may be generated by a test planning and execution model, wherein each test module defines, in terms of a set of user specified parameters, the steps needed to test a component or unit within a given computer system, comprising the steps of: (a) comparing each candidate test module considered for inclusion in the knowledge base with each existing test module in the knowledge base to determine if a given candidate test module is identical to an existing test module; (b) rejecting for inclusion in the knowledge base any candidate test module that is identical to an existing test module; (c) comparing a predetermined proper subset of the parameters defining each test module in the knowledge base with the same predetermined proper subset of parameters defining a given candidate module; (d) developing a cluster of test modules existing in the knowledge base from those test modules having a predetermined proper subset of parameters that are identical to the same predetermined proper subset of parameters included in the given candidate module; (e) determining if the given candidate test module can (and should) be merged with the cluster developed in step (d) based at least in part on a predefined set of test redundancy characteristics; (f) adding the candidate module to the knowledge base whenever it is determined that the candidate module and the cluster of modules cannot be merged; and (g) updating at least one of the existing modules in the knowledge base whenever it is determined that the candidate module and the cluster of modules should be merged.

A third specific aspect of the present invention is directed to a method for generating a non-redundant test case from a knowledge base that includes a set of non-redundant test modules, wherein each test module defines, in terms of a set of user specified parameters, the steps needed to test a component or unit within a given computer system, comprising the steps of: (a) querying the knowledge base to identify non-redundant test modules fitting preselected criteria; and (b) generating, as a result of the query, a non-redundant test case which is capable of executing the non-redundant test modules identified in step (a), wherein the non-redundant test case consists of non-redundant test modules which have not yet been executed and which are not scheduled for execution by another test case.

A fourth specific aspect of the present invention is directed to a method for executing a non-redundant test case having a set of n non-redundant test modules associated therewith, the n non-redundant test modules being included as entries in a knowledge base wherein each test module defines, in terms of a set of user specified parameters, the steps needed to test a component or unit within a given computer system, comprising the steps of: (a) executing each of the n non-redundant test modules; and (b) recording the results of each executed test module in said knowledge base in order to maintain the integrity of the non-redundant test modules stored therein and to provide information for subsequent test cases using the same knowledge base.

In addition to the processes set forth hereinabove, the invention is directed to apparatus for implementing the novel processes described herein. Such apparatus may take the form of a programmable digital computer (also referred to herein as a data processing device), programmed to execute the processes described with reference to the drawing.

The precise equipment for supporting such processes may, as will be appreciated by those skilled in the art, depend on the number of test modules being supported, test time execution requirements, cost constraints, etc. However, those skilled in the art will also readily appreciate, after reviewing the detailed description of the invention set forth herein, that commercially available personal computing systems generally have the processing, associated storage and user interface capabilities needed to practice the invention.

The invention features processes which enable the above described exemplary test review process to be automated with a particular focus on reducing and wherever possible eliminating redundant testing. The invention also features the ability to efficiently rerun the test review process dynamically as the system design changes; which is not the case for performing ongoing walk thrus in the face of system design changes.

These and other objects, embodiments and features of the present invention and the manner of obtaining them will become apparent to those skilled in the art, and the invention itself will be best understood by reference to the following Detailed Description read in conjunction with the accompanying Drawing.

BRIEF DESCRIPTION OF THE DRAWING

FIG. 2 depicts an example of six test modules which are useful in explaining the principals of the invention.

DETAILED DESCRIPTION

Figure 1:
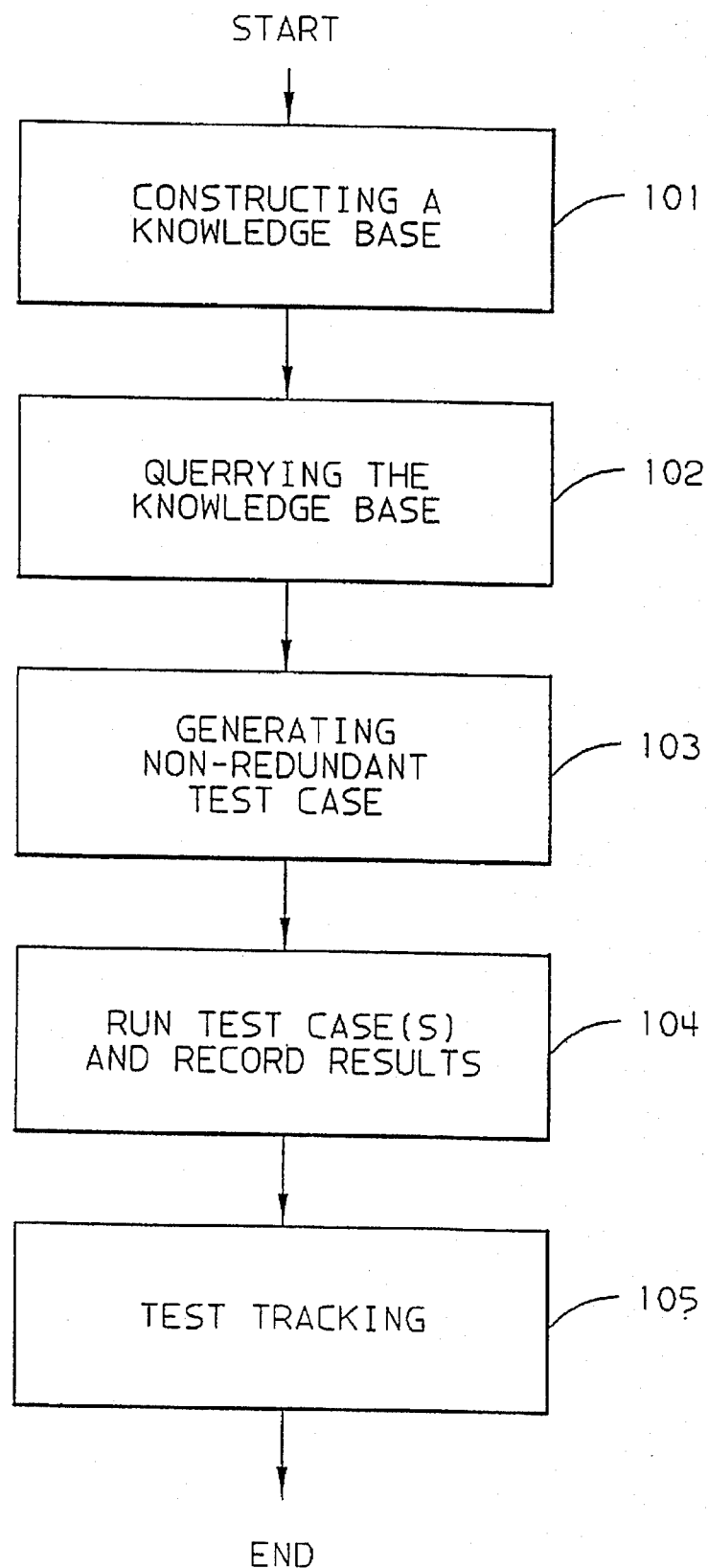
FIG. 1 depicts, in the form of a flowchart, an exemplary test planning and execution modelling process contemplated by one aspect of the present invention.

Reference should now be made to FIG. 1 which, as indicated hereinbefore, depicts in the form of a flowchart an exemplary test planning and execution modelling process contemplated by one aspect of the present invention.

The depicted process illustrated in FIG. 1 (as well as the processes depicted in the remainder of the Drawing) may be readily implemented by those skilled in the art as a set of software modules that, together with the digital processing means on which the software is executed (including a man/machine interface, such as a display, that facilitates user interaction with the processing means), constitute means for performing the various functions depicted in the Drawing, such as constructing the knowledge base, etc. The remainder of this Detailed Description assumes, without intending to limit the scope or spirit of the present invention, that the processes taught herein are being automated to an arbitrary degree selected by the user and are supported by an appropriate digital processing means and software that depend on the users application.

According to the exemplary process depicted in FIG. 1, a test planning and execution modelling process for testing a component or unit within a given computer system, includes the steps of: (a) constructing a knowledge base (as shown at block 101) from which a set of non-redundant (unique) test modules may be generated, wherein each test module defines (in terms of a set of user specified parameters) the steps needed to test a component or unit within the given computer system; (b) querying the constructed knowledge base (as shown at block 102) to identify non-redundant test modules fitting preselected criteria; and (c) generating, as a result of the query, a non-redundant test case (as shown at block 103) which is capable of executing the non-redundant test modules identified in step (b).

The exemplary process depicted in FIG. 1 (at block 101) insures the uniqueness of the test modules to be included in the knowledge base by comparing all new modules considered for inclusion therein. As a result of this comparison, a cluster of modules, with properties similar to those of the module being considered for inclusion, is generated (as will be explained in greater detail hereinafter) by the supporting digital processing means referred to hereinabove.

The cluster of modules is then (still within block 101) analyzed (either automatically by the data processing means supporting the processes being described with reference to FIG. 1; manually; or via some combination of automated and manual analysis), and a determination is made whether or not the cluster collectively, or a module within the cluster, is sufficient for testing a particular component/unit within a system.

If the cluster is deemed sufficient, the candidate module is discarded. Otherwise, the candidate module is added to the knowledge base to enhance the effectiveness of the cluster, or to start a new testing cluster.

It should be noted that a suitable exemplary process for performing the functions described generally hereinabove with reference to block 101 in FIG. 1, will be set forth hereinafter with reference to FIG. 3.

After the knowledge base is developed, it is applied to generate non-redundant tests based on given criteria. The functions of applying the knowledge base (querying it) and generating the non-redundant tests (test cases) are, as indicated hereinbefore, depicted at the aforementioned blocks 102 and 103 of FIG. 1.

The test case (or cases) generated is (are) then executed and the results are recorded in the knowledge base, as shown at block 104 in FIG. 1.

Finally, FIG. 1 depicts, at block 105, "Test Tracking", which is the function, supported by the exemplary process being described with reference to FIG. 1, which can run in parallel with and even after the execution of a test case. The Test Tracking function is defined as a utility that provides information as to the progress of a test case, such as which modules have been executed, which modules remain to be run, etc. This test tracking function is an optional feature that is included in a preferred embodiment of the test planning and execution process contemplated herein.

Reference should now be made to FIG. 2 which, as indicated hereinbefore, depicts an example of six test modules which are useful in explaining the principals of the invention. These modules are each candidate entries in the knowledge base used by the invention.

The structure of an exemplary knowledge base which supports the invention will first be described followed by an explanation of an exemplary process for constructing the knowledge base with non-redundant entries. This later explanation will be set forth with reference to FIG. 2 and FIG. 3.

According to a preferred embodiment of the invention, the knowledge base is a coverage matrix consisting of a comprehensive list of parameters, the system components and units under test, and the corresponding test modules. An exemplary list of parameters (in an exemplary knowledge base; with the parameters being shown associated with each of the six exemplary test modules depicted in FIG. 2) includes:

Name of Module
Module status
Test plan (name #1) defining a given module
Date module entered
Test plan (name #2) executing a given module
Date module executed
System under test
Sub-system under test
Component(s) under test
Unit(s) under test
Test tool to be used
Test tool options
Hardware configurations
Duration of test
Level of microcode
Level of hardware
Purpose of test
Test results
Additional comments The parameters listed above are considered useful attributes for establishing the uniqueness of a test module and were established based on experience.

To preserve the consistency of the data among all test modules, the process of developing parameter data for inclusion in the knowledge base (with selected parameters data such as unit and test tool information, etc., being shown in FIG. 2), may, according to a preferred embodiment of the invention, be summarized as follows:

(a) The module name should be based on specified conventions, such that modules defined for similar tests are assigned similar names.

(b) The module status maintained in the knowledge base should specify whether a module is "available", "planned to be executed", or "has been executed" by a test plan.

(c) The test plan (name #1) associated with a module can generated from a list of all possible test plans defined for testing a system.

(d) The date when a module is entered can be automatically generated by the model and be inserted in the knowledge base.

(e) The test plan (name #2) associated with executing a module can be generated from a list of all possible test plans defined for testing a system.

(f) The date when a module is executed can be automatically generated by the model and be inserted in the knowledge base.

(g) The system under test is automatically generated by can be automatically generated by the model and be inserted in the knowledge base.

(h) The sub-system under test (i.e. Hardware, or microcode) can be provided by the user.

(i) The unit(s) under test (e.g., support processor, CPU, I/O, etc.) can be generated from a list of all possible components under test.

(j) The component under test (e.g., component within a support processor, etc.) can be generated from a list of all possible units under test.

(k) The test tool to be used can be generated from a list of defined test tools to be applied during the test.

(l) The test tool options can be generated from a list of defined options for the specified test tool. These options could include, for example, suppressing portions of test results, etc.

(m) The hardware configurations can be generated from a list of defined hardware configurations.

(n) The duration of a given test can be generated from a list of feasible test durations.

(o) The level of microcode can be generated from a list of defined microcode levels to be tested.

(p) The level of hardware can be generated from a list of defined hardware levels to be tested.

(q) The purpose of a test can be generated from a summary of possible reasons for conducting a test (i.e., functional verification, interactions, error injections, etc.).

(r) The test results can be generated from a list of test results describing (at a general level) the results of executing a test.

(s) The additional comments can be provided to record and document deviations from a specific test module, or any recommendations that might ultimately lead to the modification of a test module.

In some cases, the lists defined above are subject to modification to accommodate changes in the design and test requirements. The input to each parameter listed above is established as a result of the user's review of a list of defined entries for that parameter. This list may be updated to include needed entries.

Figure 3:
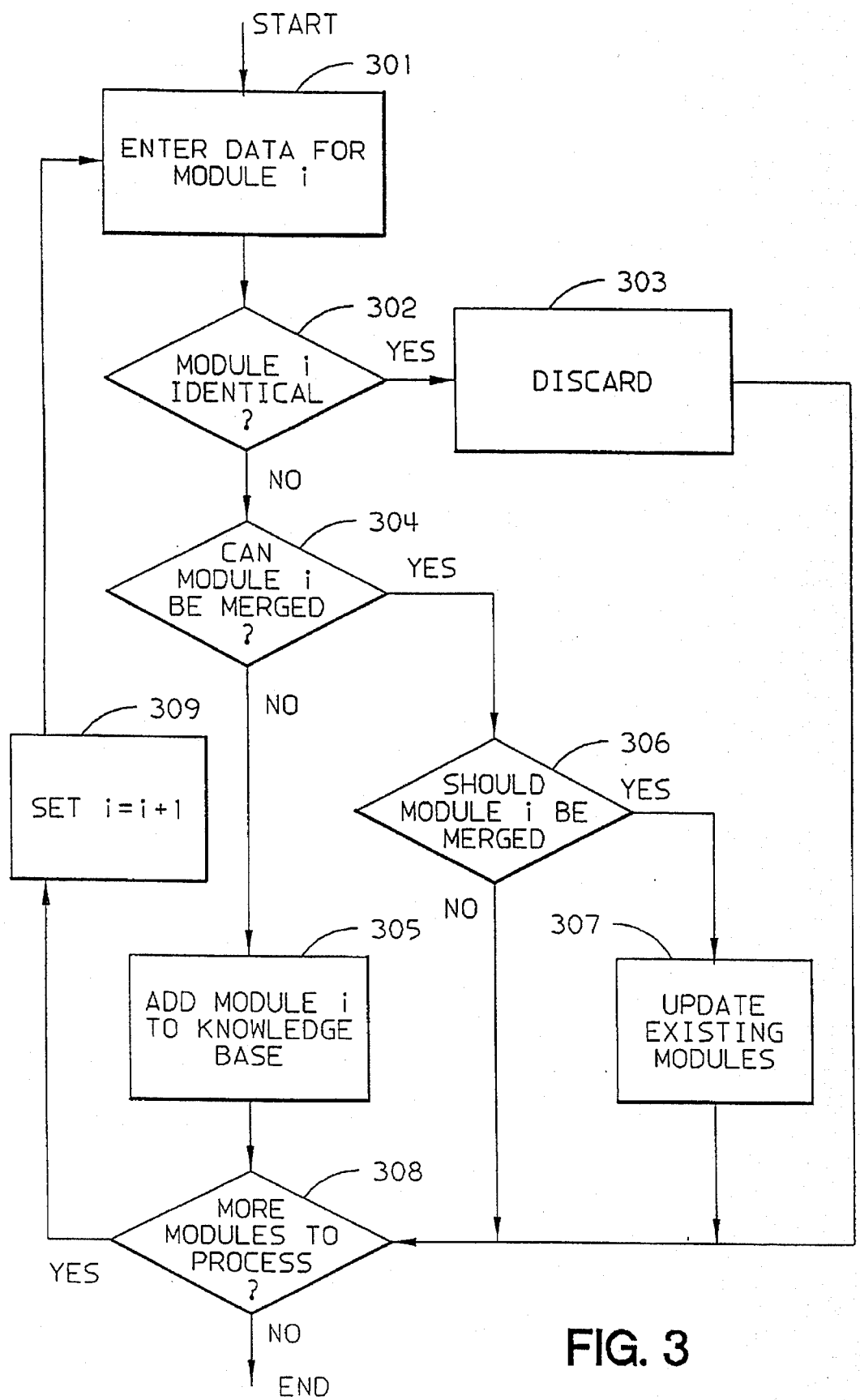
FIG. 3 depicts, in the form of a flowchart, an exemplary process for constructing a knowledge base from which non-redundant test modules may be generated by a test planning and execution model of the type described with reference to FIG. 1.

Reference should now be made to FIG. 3 which, as indicated hereinbefore depicts, in the form of a flowchart, an exemplary process for constructing a knowledge base from which non-redundant test modules may be generated by a test planning and execution model of the type described with reference to FIG. 1.

The exemplary process depicted in FIG. 3 when begins when the data (i.e., parameter information) associated with a given module is input to the data processing device supporting the test planning and execution modelling process. The input could be provided via any one of a number of well known devices providing a man/machine interface, such a CRT display, etc. The data for an arbitrary candidate test module, module i, is represented as being input to the data processing device at block 301 of FIG. 3.

To assess whether a test module can and should be included in the knowledge base (where such a test module is referred to herein as a "candidate" test module), the defined test module parameters (such as the exemplary parameters defined hereinabove) of the candidate test module are, according to the invention, compared with the parameters of the existing test modules in the knowledge base.

This may be seen with reference to FIG. 3 at block 302, which calls for testing (e.g., via comparison) to determine if module i is identical (i.e., the parameters associated with module i), to any existing module (i.e., the parameters associated with a given existing module) in the knowledge base.

If a candidate test module is identical to an existing test module in the knowledge base, it is discarded (i.e., rejected) as a candidate for inclusion in the knowledge base, thereby avoiding a redundant knowledge base entry from being made in readily understood circumstances. This discard step is indicated at block 303 of the exemplary process depicted in FIG. 3.

If, however, the candidate test module is not identical to an existing knowledge base test module, according to the invention, a "cluster" of modules (as defined hereinbefore) of equal properties is generated, and analyzed for possible inclusion in the knowledge base.

In some cases, analyzing a cluster may result in a decision to modify an existing test module rather than adding a new one. The decision to modify an existing module is based, according to the invention, at least in part on (1) a comparison of the data associated with a proper subset of parameters of the module under evaluation with corresponding data of the modules in the knowledge base; and (2) a predefined set of test redundancy characteristics, such as test modules that could serve equally well to test the components of a given unit and which otherwise differ only in test duration, etc.

The relevant determinations as to whether a cluster can and should be modified may be automated (by providing the data processing system with appropriate rules) or left to the user depending on the sophistication of the test planning and execution model being constructed.

According to an illustrative embodiment of the invention, the proper subset of parameters could, for example, be: test tool to be used, test tool options, hardware configuration, level of microcode and level of hardware. A "proper" subset of the defined parameters associated with each and every test module is called for since identical test modules have already been dealt with (with the candidate being discarded) as indicated hereinabove.

If, for example, the test duration of an existing module in a cluster is defined as four hours (as shown for test module 2 in FIG. 2), and a candidate module calls for twelve hours of testing (such as test module 3 in FIG. 2), then a possible solution (in predefined circumstances where the data associated with the above listed proper subset of parameters is equivalent as may be seen to be the case with reference to FIG. 2), might be to merge test modules 2 and 3 (with test duration set at 12 hours), thus resulting in a saving of four hours of testing and eliminating a substantially redundant test module from being maintained in the knowledge base.

The determination to modify an existing knowledge base test module in the circumstances set forth in the differing test duration example, could be easily automated by, for example, instructing (programming) the data processing means to always modify the existing knowledge base test module entry, effectively increasing the test duration of test module 2 to 12 hours and discarding candidate test module 3 after the merger, etc.

Returning to the description of FIG. 3, it can be seen that the method for constructing a knowledge base from which non-redundant test modules may be generated by a test planning and execution model, wherein each test module defines, in terms of a set of user specified parameters, the steps needed to test a component or unit within a given computer system, so far includes the steps of: (a) comparing each candidate test module considered for inclusion in the knowledge base with each existing test module in the knowledge base to determine if a given candidate test module is identical to an existing test module (block 302); (b) rejecting for inclusion in the knowledge base any candidate test module that is identical to an existing test module (block 303); (c) comparing a predetermined proper subset of the parameters defining each test module in the knowledge base with the same predetermined proper subset of parameters defining a given candidate module; (d) developing a cluster of test modules existing in the knowledge base from those test modules having a predetermined proper subset of parameters that are identical to the same predetermined proper subset of parameters included in the given candidate module; and (e) determining if the given candidate test module can be merged with the cluster developed in step (d) based at least in part on a predefined set of test redundancy characteristics (such as test duration, etc.).

Steps (c)–(e) set forth hereinabove are represented in FIG. 3 at block 304 in FIG. 3 calling for making the determination as to whether module i can be merged with (including being substituted for) existing modules in the knowledge base.

The exemplary method for constructing a knowledge base from which non-redundant test modules may be generated by a test planning and execution model adds the candidate module to the knowledge base whenever it is determined that the candidate module and the cluster of modules cannot be merged. This is illustrated in FIG. 3 at block 305.

If it is determined that the candidate module and the cluster of modules can be merged (at block 304 in FIG. 3), then the exemplary method for constructing a knowledge base from which non-redundant test modules may be generated by a test planning and execution model determines if the given candidate test module should be merged with the cluster. This determination is based at least in part on the aforementioned predefined set of test redundancy characteristics.

According to the exemplary embodiment of the invention being described with reference to FIG. 3, the illustrative process updates at least one of the existing modules in the knowledge base whenever it is determined that the candidate module and the cluster of modules should be merged. These functions (determining if a merger should take place and actually performing the merger) are depicted in FIG. 3 at blocks 306 and 307, respectively.

The determination of whether a candidate module should be merged with at least one of the modules in the knowledge base (like the determination of when a merger can legally take place): (a) can be automated by specifying merger rules apriori to the data processing device supporting the model; (b) can be performed manually through, for example, visual analysis of the parameters associated with the candidate module and its associated module cluster; and/or (c) can be performed by a combination of automated and manual techniques.

Finally, FIG. 3 goes on to depict four paths in the exemplary process, all leading directly to determining if any other candidate modules remain to be processed (as shown at block 308). The block 308 determination is made after (a) discarding a given candidate module; (b) adding a module to the knowledge base (at block 305); (c) determining that a merger is not desirable (at block 306); or (d) updating an existing module (or modules), following a merger of modules as contemplated by block 307. The exemplary process continues if more candidate modules exists; and ends if all candidate modules have been considered for inclusion or merger into the knowledge base.

Those skilled in the art will readily appreciate that the resultant knowledge base, constructed using the exemplary process and variants thereof consistent with the spirit of the invention, will result in a knowledge base that contains unique, non-redundant test modules.

According to a preferred embodiment of the invention, without intending to limit the scope of the invention, the knowledge base should be continuously assessed for functional coverage of the units and components under test during its building process. Assessing the test coverage of the knowledge base consists of investigating the test parameters, and determining whether a component or a unit is overlooked, or whether the testing in general is skewed in favor of some units or components versus others.

The intent is to have even coverage of clusters among all areas of test. Moreover, if the coverage of a component, unit, of cluster is lacking, additional test modules may be devised to cover the assessed deficiencies.

Before proceeding to describe the process by which a test case may be generated utilizing a knowledge base constructed in accordance with the teachings of the invention (or otherwise constructed such that it does not contain redundant test modules), reference should be made again to FIG. 2 to illustrate how the process depicted in FIG. 3 would operate on the six exemplary test modules depicted in FIG. 2 if they were presented as sequential candidates for inclusion in a new knowledge base being constructed in accordance with the teachings of the invention.

If test module 1 as shown in FIG. 2 (the first column of data) were initially input to, for example, data processing means programmed to support the process described hereinabove with reference to FIG. 3, then test module 1 would be included in the initially empty knowledge base (since it would not be identical to any other test module in the knowledge base). The test for any more modules to process (6 in total), shown at block 308, would result in the next of the 6 illustrative test modules being analyzed next via the exemplary process depicted in FIG. 3.

If test module 2 was input next, it would (with reference to FIG. 3), not be identical to test module 1 (as determined at block 302); and would not be considered as a merger candidate (with test module 1), since different test tools (tools A and B for test modules 1 and 2 respectively, as shown in FIG. 2), are called for (i.e., there would not be an equivalence between the illustrative proper subset of parameters, which included "test tool", in the candidate test module and the only other test module in the knowledge base). Therefore, after the test shown at block 304, test module 2 would be added to the knowledge base (at block 305 of the exemplary process depicted in FIG. 3), and test module 3 would be input for examination.

Test module 3 is clearly not identical to the two test modules in the knowledge base; however, as indicated hereinbefore, the proper (illustrative) subset of parameters consisting of "test tool"; "test tool options"; "hardware configuration"; "level of microcode" and "level of hardware", is identical (as determined at block 304 of FIG. 3), making test module 3 a candidate for merger with test module 2. For the reasons set forth hereinabove, the illustrative process determines the merger should take place (presuming the data processing means is programmed, or the user decides manually, to implement the "duration" example set forth hereinabove and run only the 12 hour test, saving 4 hours of testing, to test the I/O unit common to test modules 2 and 3). Thus the path thru blocks 306 and 307 of FIG. 3 is followed before proceeding to input test module 4 (with test module 3 being merged with test module 2 in the knowledge base).

Illustrative test modules 4, 5 and 6, depicted in FIG. 2, may be processed in a manner similar to the process described hereinabove. Test modules 4 and 5 would be included in the knowledge base since the test module 4 hardware configuration is not the same as any potential cluster of modules in the knowledge base being constructed; and the level of micro code is not the same as any potential cluster in the knowledge base, for test module 5.

Test module 6 would be a merger candidate (satisfying the test at block 305 in FIG. 3; the illustrative proper subset of parameters described hereinabove is the same for test module 2 and test module 6); however, the data processing means could, for example, determine that test module 6 should not be merged with test module 2 (at block 306 in FIG. 3) since (again, for the sake of illustration only) a rule could be devised such as "never merge two modules applied to test different systems", etc. In this case the path thru block 306 would lead directly to block 308 after which the exemplary process would end.

When the knowledge base is complete, a test case may be generated by querying the knowledge base for test modules fitting a given criteria. The criteria could include, for example, the identity of the component or unit, under test, the purpose of the test, the choice of a test tool and test tool options, etc.

As a result of the query, the modules listed in the test case are, according to a preferred embodiment of the invention, flagged as "planned to be tested" in the knowledge base, and the following four lists are generated:

List 1: A list of all possible non-redundant test modules;

List 2: A list of modules (taken from List 1) which have been previously executed via other test plans and their associated test results;

List 3: A list of modules (taken from List 1) which are already planned to be executed via other test plans; and List 4: A list of modules (taken from List 1) which have not yet been executed and are not currently planned to be executed via other test plans.

For example, assuming that a functional verification test of a DASD controller is to be conducted by applying a particular test tool based on a defined set of options for four hours. In this exemplary case, all modules fitting the above criteria are generated (List 1).

Also, a list of the modules that have been executed (List 2), and a list of the modules that are planned to be executed (List 3) are generated. For the modules, that have been executed, the list includes the results of the tests and the conditions, under which the results were generated, including those not specified by given criteria (i.e., hardware configuration, microcode level, hardware level, etc.).

For the modules, that are planned to be executed, the list includes the test plans via which the modules will be executed.

The information contained in the non-redundant list (LIST 4) specifies the tools to be used to test the DASD controller, the options, the hardware configuration, etc.

The aforementioned exemplary lists are being set forth only for the purpose of illustration only. Those skilled in the art could devise other "lists" and/or other types of data structures with the same goal in mind; namely to identify a set of test modules that have not yet been executed and are not currently planned to be executed via other test plans.

Figure 4:
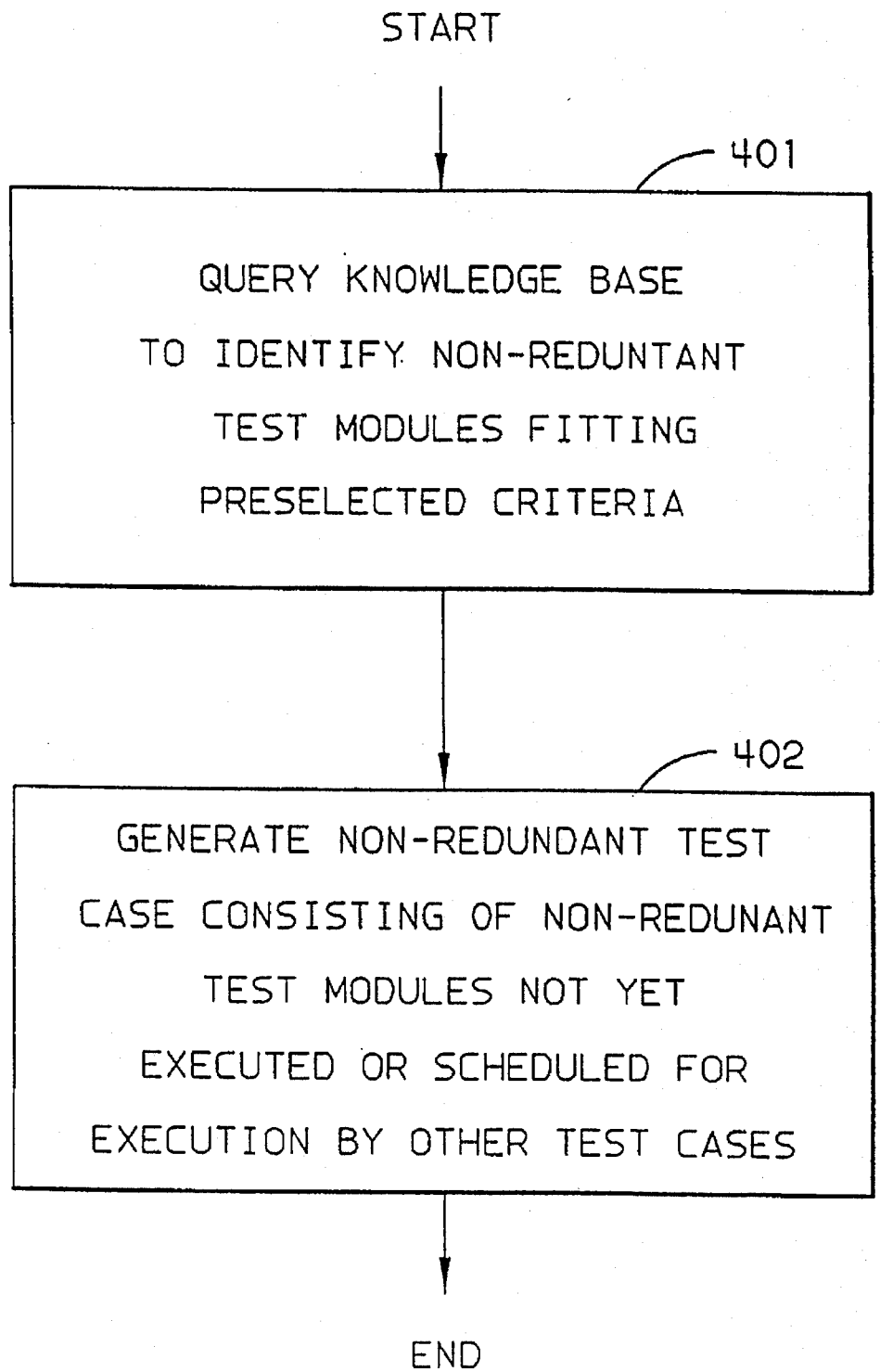
FIG. 4 depicts, in the form of a flow chart, an exemplary process for generating non-redundant test cases.

Reference should now be made to FIG. 4 which as indicated hereinbefore, depicts (in the form of a flow chart) an exemplary process for generating non-redundant test cases from a knowledge base that includes a set of non-redundant test modules (wherein each test module defines, in terms of a set of user specified parameters, the steps needed to test a component or unit within a given computer system).

The depicted exemplary process summarizes the illustrative process steps described hereinabove for generating a test case in accordance with the teachings of the invention, namely: (a) querying the knowledge base to identify non-redundant test modules fitting preselected criteria (shown at block 401); and (b) generating, as a result of the query, a non-redundant test case which is capable of executing the non-redundant test modules identified in step (a), wherein the non-redundant test case consists of non-redundant test modules which have not yet been executed and which are not scheduled for execution by another test case (with step (b) being represented at block 402).

Figure 5:
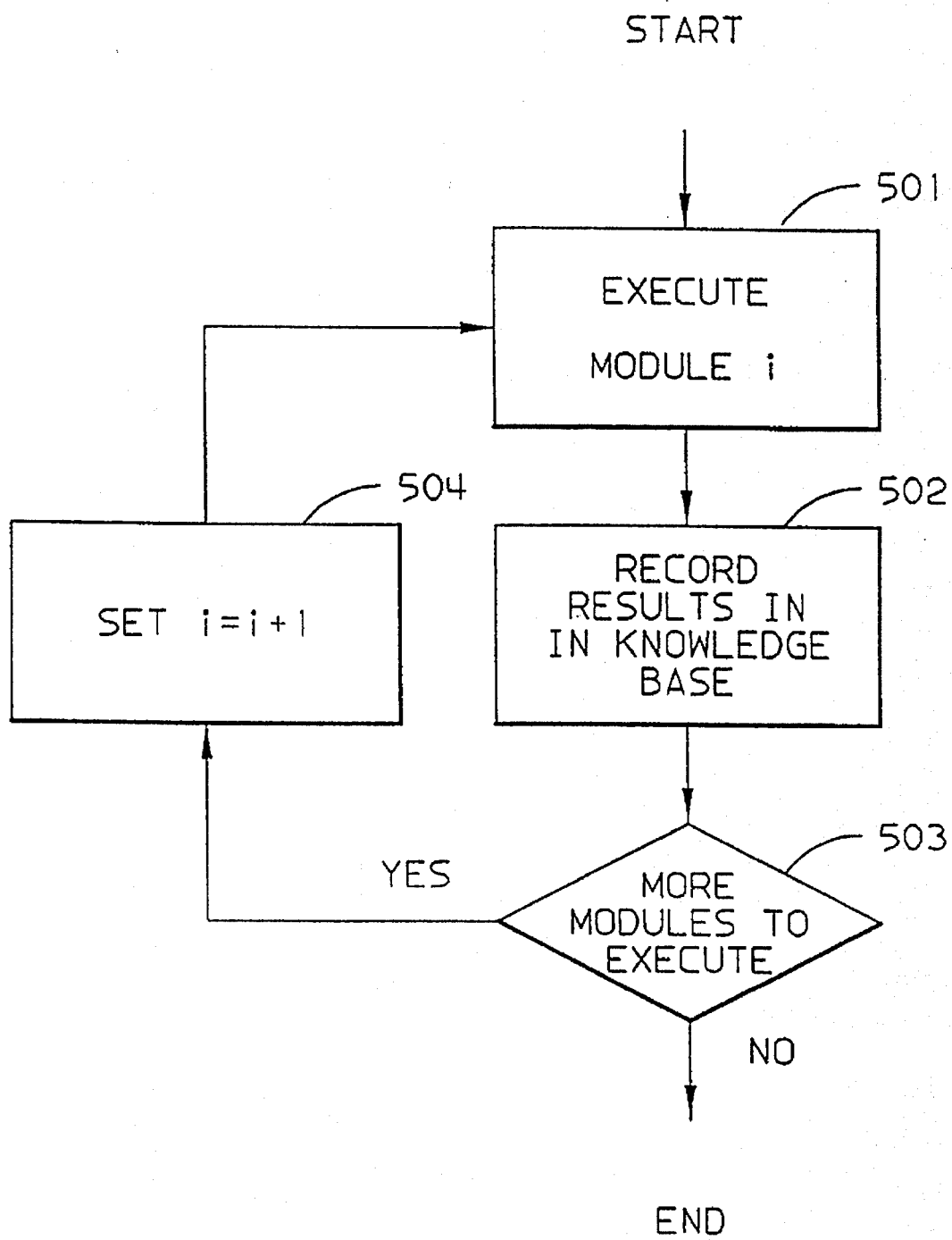
FIG. 5 depicts, in the form of a flowchart, a process for executing an exemplary test case.

Reference should now be made to FIG. 5 which as indicated hereinbefore depicts (in the form of a flowchart) an exemplary process for executing an exemplary test case test case having n test modules associated therewith. The process depicted in FIG. 5 assumes that as a result of querying the knowledge base, a list of n non-redundant test modules (like List 4) is generated, and is ready to be executed.

An exemplary process for executing a given test case, in accordance with the teachings of the invention, may be summarized as including the following steps: (a) executing test module i (where i is an integer with a domain of 1 thru n), as indicated at block 501; (b) recording the results in the knowledge base in the entry associated with test module i (including, in accordance with a preferred embodiment of the invention, setting a test module flag indicating the test has been completed, as described hereinafter), as indicated at block 502; and (c) testing to determine if all n test modules, in the test case being executed, have been run (executing the next module and again recording the results as long as their are test modules remaining to be run), as indicated by block 503 and the loop back to module 501 via block 504.

After the test execution is complete, the following steps should be taken, in accordance with a preferred embodiment of the invention, with respect to the information being maintained in the knowledge base:

1. The executed test modules should be flagged as completed;

2. Deviations from the test modules should be recorded; and

3. Information, that may lead to the modification of a test module should also be recorded.

The processes described hereinbefore provide the capability, via the use of a knowledge base, to select and run customized and non-redundant test cases. Some further advantages of the invention include (a) reducing test cycle time by reducing redundant testing; (b) allowing the planning of what and how to test to be shifted to the early phases of the test cycle; (c) providing the ability to track and implement process improvements by making enhancements to the knowledge base; .(d) providing the ability to scrutinize and assess the usefulness of a test module during the early phases of the test cycle when the knowledge base is being built; (e) providing the ability to carry over the knowledge base from one system to another, thus applying the knowledge and experience of previously tested systems; and (f) providing the ability to automate the execution of a test from the test parameter matrix presuming the adoption of a standardized structure of for test modules.

The knowledge base constructed in accordance with the teachings of the invention may be applied in a number of process tracking situations and test evaluations. The advantages in this area include the ability to (a) assess functional test coverage; (b) assess testing progress based on what was executed and the conditions that were present; and (c) assess test progress based on the amount of test time remaining.

What has been described in detail hereinabove are methods and apparatus meeting all of the aforestated objectives. As previously indicated, those skilled in the art will recognize that the foregoing description has been presented for the sake of illustration and description only. It is not intended to be exhaustive or to limit the invention to the precise form disclosed, and obviously many modifications and variations are possible in light of the above teaching.

The embodiments and examples set forth herein were presented in order to best explain the principles of the instant invention and its practical application to thereby enable others skilled in the art to best utilize the instant invention in various embodiments and with various modifications as are suited to the particular use contemplated.

It is, therefore, to be understood that the claims appended hereto are intended to cover all such modifications and variations which fall within the true scope and spirit of the invention.

What is claimed is:

1. A method for executing a non-redundant test case needed to test a component or a unit within a given computer system, the non-redundant test case having a set of n non-redundant test modules associated therewith, wherein n is any positive integer, said n non-redundant test modules being included as entries in a knowledge base wherein each non-redundant test module defines, in terms of a set of user specified parameters, the steps needed to test the component or unit within the given computer system, the method comprising the steps of:

(a) executing each of said n non-redundant test modules; wherein said step of executing includes the steps of:

(1) inputting a user specified test module parameter data set;

(2) comparing said user specified test module parameter data set to a knowledge base specified test module parameter data set;

(3) generating a non-redundant test module parameter data set from said comparison, wherein said step of generating includes the step of generating a first non-redundant test module parameter data set from said comparison if said user specified test module parameter data set is different from said knowledge base specified test module parameter data set;

(4) applying said non-redundant test module parameter data set to said component; and (5) sampling said component undergoing said application of non-redundant test module parameter data for collecting result data;

(b) recording the result data of each executed non-redundant test module in said knowledge base in order to maintain the knowledge base specified test module parameter data set integrity of the non-redundant test modules stored therein and to provide information for subsequent test cases using the same knowledge base.

2. A method for executing a non-redundant test ease needed to test a component or a unit within a given computer system, the non-redundant test case having a set of n non-redundant test modules associated therewith, wherein n is any positive integer, said n non-redundant test modules being included as entries in a knowledge base wherein each non-redundant test module defines, in terms of a set of user specified parameters, the steps needed to test the component or unit within the given computer system, the method comprising the steps of:

(a) executing each of said n non-redundant test modules; wherein said step of executing includes the steps of:

(1) inputting a user specified test module parameter data set;

(2) comparing said user specified test module parameter data set to a knowledge base specified test module parameter data set;

(3) generating a non-redundant test module parameter data set from said comparison, wherein said step of generating includes the step of generating a first non-redundant test module parameter data set from said comparison if said user specified test module parameter data set is identical to said knowledge base specified test module parameter data set; said first non-redundant test module parameter data set being identical to said knowledge base specified test module parameter data set;

(4) applying said non-redundant test module parameter data set to said component; and (5) sampling said component undergoing said application of non-redundant test module parameter data for collecting result data;

(b) recording the result data of each executed non-redundant test module in said knowledge base in order to maintain the knowledge base specified test module parameter data set integrity of the non-redundant test modules stored therein and to provide information for subsequent test cases using the same knowledge base.

3. The method of claim 2 wherein said step of generating a non-redundant test module parameter data set from said comparison further comprises the step of:

(a) generating a second non-redundant test module parameter data set from said comparison if said user specified test module parameter dam set is different from said knowledge base specified test module parameter data set.

4. A method for executing a non-redundant test case needed to test a component or a unit within a given computer system, the non-redundant test case having a set of n non-redundant test modules associated therewith, wherein n is any positive integer, said n non-redundant test modules being included as entries in a knowledge base wherein each non-redundant test module defines, in terms of a set of user specified parameters, the steps needed to test the component or unit within the given computer system, the method comprising the steps of:

(a) executing each of said n non-redundant test modules; wherein said step of executing includes the steps of:

(1) inputting a user specified test module parameter data set;

(2) comparing said user specified test module parameter data set to a knowledge base specified test module parameter data set;

(3) generating a non-redundant test module parameter data set from said comparison, wherein said step of generating includes the steps of:

(i) generating a first non-redundant test module parameter data set from said comparison if said user specified test module parameter data set is different from said knowledge base specified test module parameter data set; and (ii) generating a second non-redundant test module parameter data set from said comparison if said user specified test module parameter data set is identical to said knowledge base specified test module parameter data set; said second non-redundant test module parameter data set being identical to said knowledge base specified test module parameter data set;

(4) applying said non-redundant test module parameter data set to said component; and (5) sampling said component undergoing said application of non-redundant test module parameter data for collecting result data;

(b) recording the result data of each executed non-redundant test module in said knowledge base in order to maintain the knowledge base specified test module parameter data set integrity of the non-redundant test modules stored therein and to provide information for subsequent test cases using the same knowledge base.

* * * * *

UNITED STATES PATENT AND TRADEMARK OFFICE
CERTIFICATE OF CORRECTION

PATENT NO.    : 5,629,878
DATED         : May 13, 1997
INVENTOR(S)   : Walid M. Kobrosly It is certified that error appears in the above-identified patent and that said Letters Patent is hereby corrected as shown below:

Column 15, line 30 "ease' should read --case--.

Signed and Sealed this

Twenty-first Day of October 1997

*Attest:*

BRUCE LEHMAN

*Attesting Officer*   *Commissioner of Patents and Trademarks*